United States Patent [19]
Scherman et al.

[11] Patent Number: 6,033,229
[45] Date of Patent: Mar. 7, 2000

[54] MEDICAL DEVICE FOR TOILET TRAINING YOUNG CHILDREN

[75] Inventors: Susan L. Scherman, 7 Cooper Pl., Weehawken, N.J. 07087; Edward J. Baird, Maspeth, N.Y.

[73] Assignee: Susan L. Scherman, Weehawken, N.J.

[21] Appl. No.: 09/200,994

[22] Filed: Nov. 30, 1998

[51] Int. Cl.[7] .................................................. A63H 13/00
[52] U.S. Cl. .......................... 434/267; 434/262; 446/176; 446/197
[58] Field of Search ..................................... 434/262, 267, 434/268, 272, 275; 446/176, 183, 193, 197, 198, 199

[56] References Cited

U.S. PATENT DOCUMENTS

| D. 310,856 | 9/1990 | Pedersen .............................. 434/267 X |
|---|---|---|
| 489,014 | 1/1893 | King . |
| 1,141,721 | 6/1915 | Mastin . |
| 1,143,458 | 6/1915 | Stern . |
| 2,675,644 | 4/1954 | Senior et al. . |
| 2,711,612 | 6/1955 | Wister . |
| 2,907,139 | 10/1959 | Rekettye . |
| 3,959,919 | 6/1976 | Baulard-Cogan . |
| 4,151,675 | 5/1979 | Juan . |
| 4,439,162 | 3/1984 | Blaine ..................................... 434/268 |
| 4,938,696 | 7/1990 | Foster et al. ............................ 434/267 |
| 5,096,424 | 3/1992 | Carlberg ................................. 434/262 |
| 5,509,808 | 4/1996 | Bell . |

FOREIGN PATENT DOCUMENTS

| 559650 | 8/1957 | Belgium . |
|---|---|---|
| 1084950 | 1/1955 | France . |
| 2705907 | 12/1994 | France . |
| 2113366 | 10/1971 | Germany . |
| 3116639 | 5/1982 | Germany ............................... 434/267 |

OTHER PUBLICATIONS

Health Care Educational Materials, NASCO Corp., 1992–93 Catalog, pp. 32–33.

Catalog #116, Armstrong Medical Indus., Inc., Jan. 1992, pp. 35,37,40,42.

*Primary Examiner*—Sam Rimell
*Attorney, Agent, or Firm*—David M. Quinlan

[57] ABSTRACT

A medical device comprises a model of a male child with a urination-simulating mechanism including a removable reservoir disposed interiorly of the model for holding a liquid and a pumping mechanism for expelling the liquid from the reservoir into a passage upon actuation of the pumping mechanism. A penis member on the model has an opening simulating the urethral opening in a human penis, and the passage is in communication with the opening. The arms of the model are movable and Velcro® fastening material on the penis member and on the hands of the model attach the hands to the penis member in a manner that illustrates how an adult male grasps his penis during urination. The model is placed in front of a toilet with the opening in the penis member pointed toward the toilet bowl and with the hands attached to the penis member, and the adult performing the demonstration actuates the pumping mechanism to expel liquid from the opening and simulate urination.

13 Claims, 3 Drawing Sheets

MEDICAL DEVICE FOR TOILET TRAINING YOUNG CHILDREN

BACKGROUND OF THE INVENTION

1. Field of the Invention

The present invention relates to a medical device, and more particularly, to a medical device that teaches male children how to urinate into a toilet.

2. Description of Related Technology

Parents with children of toddler age, that is, from about two to four years of age, face one of the major challenges of early parenthood when they undertake toilet training. This task can be particularly difficult with boys because they do not simply sit on a training toilet to urinate.

Teaching a boy to urinate into a toilet while standing can be a difficult proposition. Holding his penis for him while he urinates could be regarded as inappropriate by many, and can be unhygienic. Likewise, having him watch an adult male urinate not only could be considered inappropriate, but also has limited training value. And verbal explanations can be difficult for young children to understand, particularly considering that the process of toilet training can be very stressful to a child anyway. That can make it hard for him to concentrate while urinating on what to him are complicated instructions and at the same time try to keep himself dry and avoid urinating on the floor.

Of course, dolls that simulate urination are well known in the prior art. Examples are shown in French Patent 1,084,950, French Patent 2,705,907, U.S. Pat. No. 4,151,675 and U.S. Pat. No. 5,509,808. Most of these examples appear to be designed for play, not as toilet training aids. U.S. Pat. No. 5,509,808 is intended to assist in toilet training, but it uses a doll that sits on a toy toilet, and therefore does not illustrate for young boys how to urinate into a toilet while standing up.

SUMMARY OF THE INVENTION

It is an object of the present invention to provide a medical device that illustrates to a young boy how to urinate into a toilet while standing up.

It is another object of the present invention to provide a medical device comprising a model of a male child with movable arms terminating in hands, a urination-simulating mechanism including a reservoir disposed interiorly of the model for holding a liquid and a pumping mechanism for expelling the liquid from the reservoir into a passage leading from the reservoir upon actuation of the pumping mechanism, a penis member on the model having an opening simulating the urethral opening in a human penis, the passage being in communication with the opening, and attaching means on the penis member and on the hands of the model for attaching the hands to the penis member in a manner that illustrates how an adult male grasps his penis during urination.

In another aspect of the invention, a method of toilet training a human child comprising the steps of providing a model of a male child with movable arms terminating in hands, a urination-simulating mechanism including a reservoir disposed interiorly of the model for holding a liquid and a pumping mechanism for expelling the liquid from the reservoir into a passage leading from the reservoir upon actuation of the pumping mechanism, a penis member on the model having an opening simulating the urethral opening in a human penis, the passage being in communication with the opening, and attaching means on the penis member and on the hands of the model for attaching the hands to the penis member, placing the model proximate to a toilet with the opening pointed toward the toilet, attaching the hands to the penis member in a manner that illustrates how an adult male grasps his penis during urination, and actuating the pumping mechanism to expel liquid from the reservoir into the toilet to simulate urination.

BRIEF DESCRIPTION OF THE DRAWINGS

The objects of the invention will be better understood from the detailed description of its preferred embodiments which follows below, when taken in conjunction with the accompanying drawings, in which like numerals refer to like features throughout. The following is a brief identification of the drawing figures used in the accompanying detailed description.

DETAILED DESCRIPTION OF PREFERRED EMBODIMENTS

Figure 1:
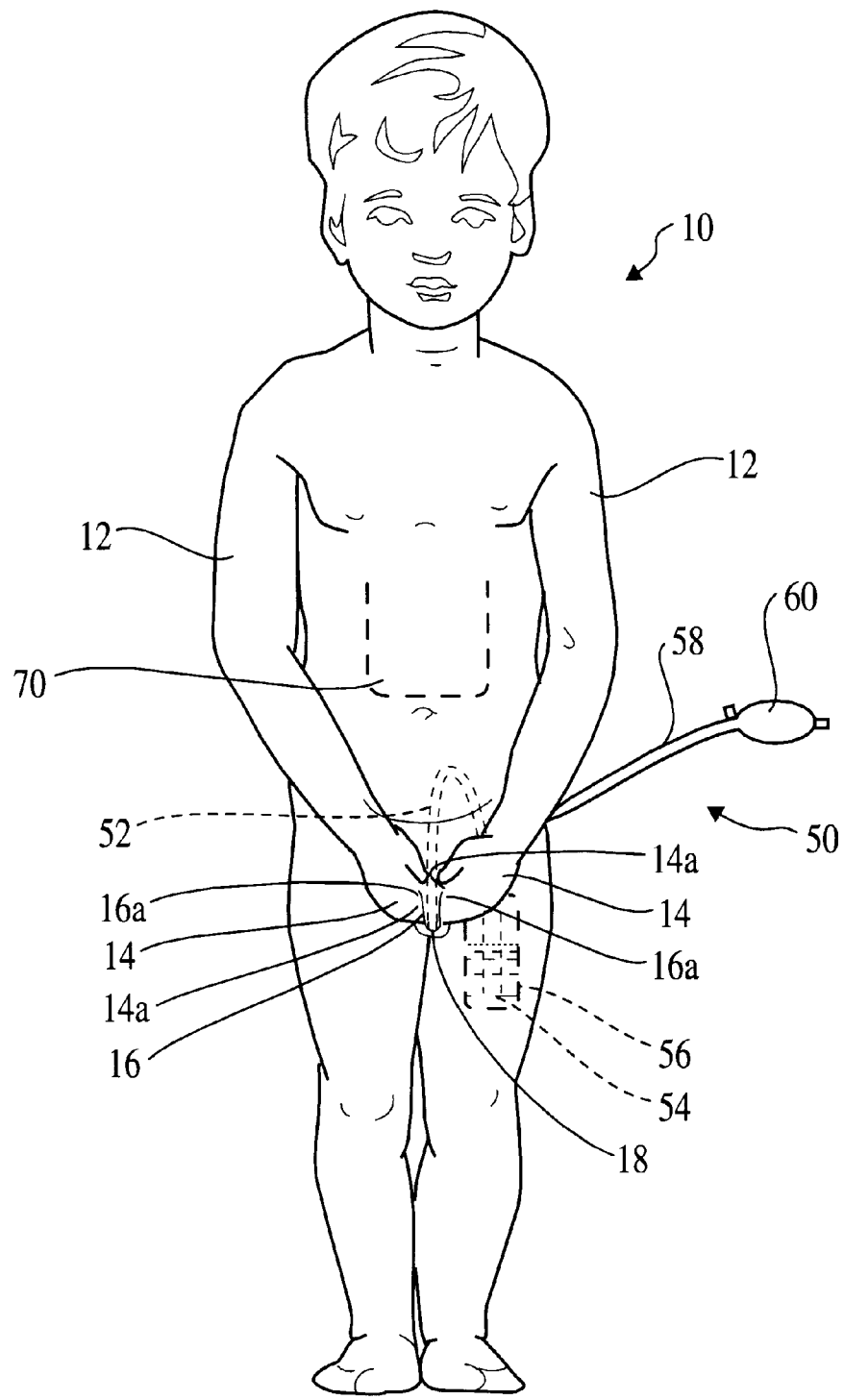
FIG. 1 is a front elevation view of a medical device embodied in a model of a male child capable of illustrating how to urinate while standing in front of a toilet, in accordance with an embodiment of the present invention.
Figure 2:
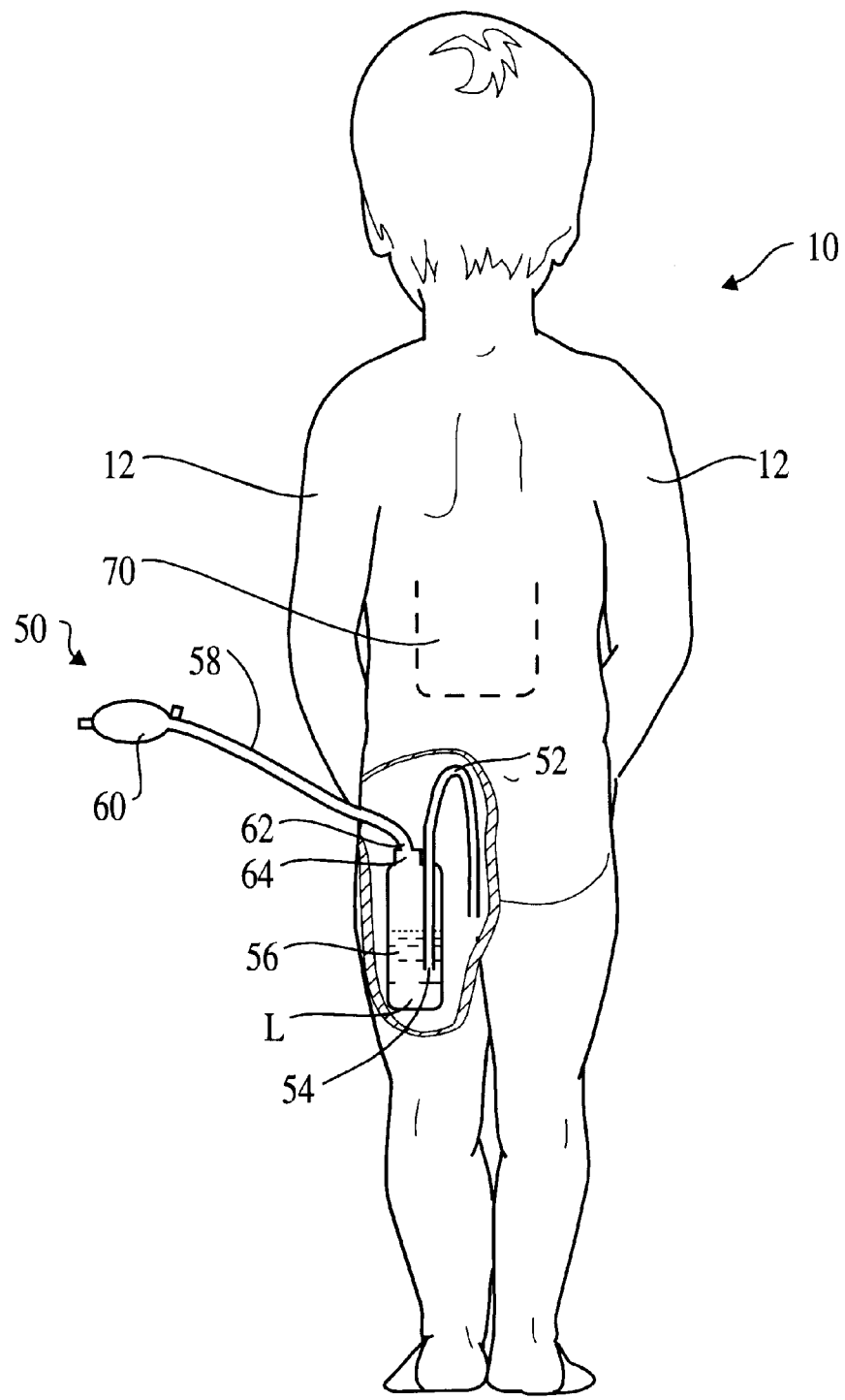
FIG. 2 is a rear view of the medical device shown in FIG. 1, partially cut away to show the urination-simulating mechanism according to the present embodiment of the invention.

FIGS. 1 and 2 depict a medical device comprising a model 10 of a male child in accordance with one embodiment of the invention. The model 10 is made to represent as closely as practicable a boy of about two to four years of age. Accordingly, it is preferably made with the proportions of a young child rather than an adult.

For purposes described in more detail below, the model 10 has movable arms 12 that terminate in hands 14. The arms may be made sufficiently movable by making them of fabric stuffed with a flexible foam-like material, for example, and sewing them to the model's torso by sewing. The model 10 also includes a realistic penis member 16 that has at its end an opening 18 that simulates the urethral opening in a human penis. The hands 14 can be molded of an appropriate plastic material in a configuration suitable for simulating grasping the penis member 16 during urination.

The penis member 16 is also molded from an appropriate plastic material, typically as an integral part of the torso of the model 10. However, it is within the scope of the invention also to make the penis member flexible to provide more realism. In that regard, the hands 14 can also be made flexible so that their configuration can be manipulated to grasp the penis member 16 in a more realistic fashion.

In any event, the hands 14 and the penis member 16 include cooperating attaching means that enable the hands 14 to be attached to the penis member in a manner that illustrates how an adult male grasps his penis during urination. In the present embodiment, the attaching means comprises cooperating strips 14a and 16a of Velcro® hook and loop type fastening materials on the hands and the penis member. However, the invention is not restricted to the use of any particular attaching means, which can be of any construction or configuration that attaches the hands to the penis member and still remain within the scope of the invention.

The model 10 includes a urination-simulating mechanism 50. This mechanism includes a tube 52, one end of which comprises the opening 18 in the penis member 16. The other end 54 of the tube 52 extends into a reservoir 56 in the interior of the model 10. The reservoir 56 holds a liquid L and the tube 52 extends into the reservoir so that its end 54 is proximate to the bottom of the reservoir and therefore below the level of the liquid L.

A pumping mechanism expels the liquid L from the reservoir 56 into the tube 52 by pressurizing the reservoir above the liquid L. As seen more clearly in FIG. 2, a pressurizing tube 58 terminates at one end in a flexible bulb 60. The other end 62 of the pressurizing tube 58 is sealed to the top of the reservoir 56. When the bulb is squeezed, the space above the liquid L in the reservoir is pressurized and liquid is forced out of the reservoir through the tube 52. (Directional or positional terms such as "top," "below," "above" and the like are used herein for convenience in describing the depicted embodiment of the invention. Those terms refer to the normal orientation of the described model when it is being used, and employment herein of such terms should not be taken as limiting the invention in any way.)

Access to the reservoir 56 is through a hinged access panel 70 in the back of the model. The reservoir 56 will typically be a bottle-like receptacle removably supported in a bracket (not shown) inside the hip or thigh region of the model. The tube 52 is flexible and can be easily removed from the reservoir so that the reservoir can be removed through the panel 70 for refilling. The pressurizing tube 58 most conveniently is molded or otherwise attached to a threaded cap 64 that is removed from the reservoir to readily enable the reservoir to be refilled when the liquid has been depleted.

Figure 3:
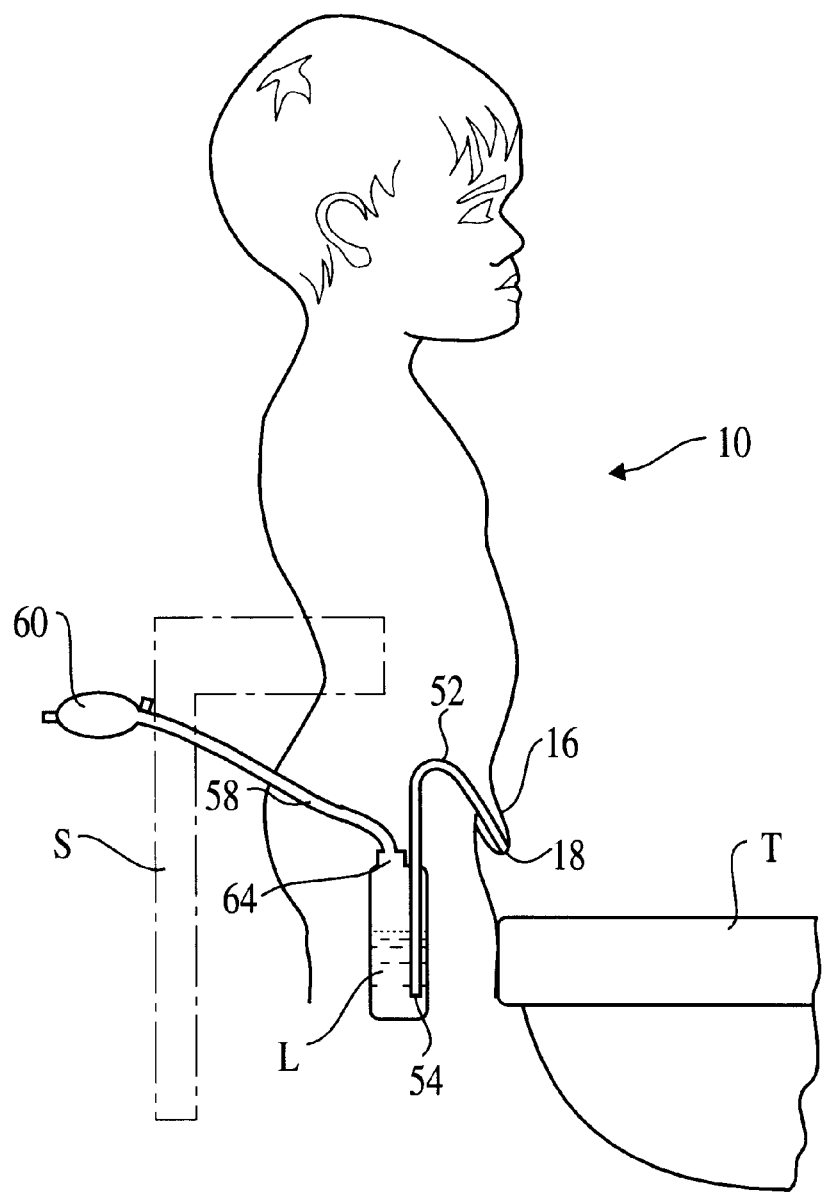
FIG. 3 is a side sectional view of the medical device shown in FIG. 1, illustrating the use thereof in toilet training.

FIG. 3 illustrates how the model is used to train a young boy to urinate into a toilet T. For ease of operation, the model 10 is held in a stand S, shown in phantom lines in FIG. 3, with the penis member 16 in position over the toilet T and the opening 18 pointed toward the toilet. This enables the child to see how to stand relative to a toilet when urinating. The hands 14 (omitted from FIG. 3 for clarity) are attached to the penis member 16 (either before or after the model is placed in position at the toilet) to illustrate how to grasp the penis when urinating. The adult conducting the demonstration then actuates the pumping mechanism by squeezing the bulb 60 to force the liquid L into the tube 52 and expel it from the opening 18 in the penis member 16 into the toilet T.

It will be appreciated that pumping mechanisms other than that depicted in the drawings can be used. For example, the bulb 60 can be replaced by a foot pedal that pressurizes the space in the reservoir above the liquid. It will also be appreciated from the drawings that the level of the liquid L in the reservoir should be maintained below the opening 18 in the penis member 16. Otherwise, the tube 52 can act as a siphon and liquid may continue to drain from the reservoir even after the bulb is released.

Although preferred embodiments of the invention have been depicted and described, it will be understood that various modifications and changes can be made other than those specifically mentioned above without departing from the spirit and scope of the invention, which is defined solely by the claims that follow.

What is claimed is:

1. A medical device comprising:
   a model of a male child with movable arms terminating in hands;
   a urination-simulating mechanism including a reservoir disposed interiorly of said model for holding a liquid and a pumping mechanism for expelling the liquid from said reservoir into a passage leading from said reservoir upon actuation of said pumping mechanism;
   a penis member on said model having an opening simulating the urethral opening in a human penis, said passage being in communication with said opening; and
   attaching means on said penis member and on the hands of said model for attaching the hands to said penis member in a manner that illustrates how an adult male grasps his penis during urination.

2. A medical device as in claim 1, wherein said passage comprises a tube leading to said opening from an end in said reservoir below a level of the liquid therein.

3. A medical device as in claim 2, wherein said pumping mechanism expels the liquid from said reservoir by increasing the air pressure within said reservoir above the liquid.

4. A medical device as in claim 3, wherein said pumping mechanism includes a pressurizing tube with one end communicating with said reservoir above the level of the liquid therein and another end having a pump attached thereto outside said model.

5. A medical device as in claim 4, wherein said pump comprises a flexible squeeze bulb.

6. A medical device as in claim 4, wherein said opening is disposed at a predetermined level when said model is oriented in a position to simulate urination of an adult male and said reservoir is disposed in said model with the level of the liquid in the reservoir below the level of said opening.

7. A medical device as in claim 1, wherein said reservoir is removable from the interior of said model to enable said reservoir to be refilled.

8. A medical device as in claim 1, wherein said attaching means permits said hands to be removably attached to said penis member.

9. A medical device as in claim 8, wherein said attaching means comprises hook and loop type fastening materials on said hands and said penis member.

10. A method of toilet training a human child comprising the steps of:
    providing a model of a male child with movable arms terminating in hands, a urination-simulating mechanism including a reservoir disposed interiorly of said model for holding a liquid and a pumping mechanism for expelling the liquid from said reservoir into a passage leading from said reservoir upon actuation of said pumping mechanism, a penis member on said model having an opening simulating the urethral opening in a human penis, said passage being in communication with said opening, and attaching means on said penis member and on the hands of said model for attaching the hands to said penis member;
    placing said model proximate to a toilet with said opening pointed toward the toilet;
    attaching said hands to said penis member in a manner that illustrates how an adult human male grasps his penis during urination; and
    actuating said pumping mechanism to expel liquid from said reservoir into the toilet to simulate urination.

11. A method as in claim 10, wherein said pumping mechanism includes a pressurizing tube with one end communicating with said reservoir above a level of the liquid therein and another end having a pump attached thereto outside said model, said actuating step comprising actuating said pump.

12. A method as in claim 11, wherein said pump comprises a flexible squeeze bulb.

13. A method as in claim 11, wherein said placing step is performed by supporting said model in a stand.

* * * * *